United States Patent
Okahisa

(10) Patent No.: US 9,073,221 B2
(45) Date of Patent: Jul. 7, 2015

(54) WORKING ROBOT AND PROCESSING PLANT

(75) Inventor: Manabu Okahisa, Fukuoka (JP)

(73) Assignee: KABUSHIKI KAISHA YASKAWA DENKI, Kitakyushu-Shi (JP)

(*) Notice: Subject to any disclaimer, the term of this patent is extended or adjusted under 35 U.S.C. 154(b) by 646 days.

(21) Appl. No.: 13/400,529

(22) Filed: Feb. 20, 2012

(65) Prior Publication Data

US 2013/0058749 A1    Mar. 7, 2013

(30) Foreign Application Priority Data

Sep. 7, 2011 (JP) ................................. 2011-195351

(51) Int. Cl.
| | |
|---|---|
| *B25J 9/12* | (2006.01) |
| *B25J 19/06* | (2006.01) |
| *B25J 9/06* | (2006.01) |
| *B25J 9/10* | (2006.01) |
| B25J 5/02 | (2006.01) |
| B66C 23/00 | (2006.01) |
| B25J 19/00 | (2006.01) |

(52) U.S. Cl.
CPC ............ *B25J 19/06* (2013.01); *Y10T 74/20305* (2015.01); *B25J 5/02* (2013.01); *B66C 23/005* (2013.01); *B25J 19/0008* (2013.01); *B25J 9/06* (2013.01); *B25J 9/1065* (2013.01); *B25J 9/12* (2013.01); *B25J 19/0012* (2013.01)

(58) Field of Classification Search
CPC ................. B25J 3/02; B25J 3/04; B25J 5/02; B25J 9/04; B25J 9/041; B25J 9/042; B25J 9/046; B25J 9/06; B25J 9/1065; B25J 9/12; B25J 13/08; B25J 13/085; B25J 19/0008; B25J 19/0012; B66C 23/00; B66C 23/005; B66C 23/02; B66C 23/06; B66C 23/72
USPC ........... 212/317; 414/222.01, 222.03, 222.13, 414/225.01, 618, 680, 729, 732, 735, 738, 414/744.1, 744.2, 744.3, 744.4, 744.5, 414/744.6, 744.7; 901/15, 20, 23, 48
See application file for complete search history.

(56) References Cited

U.S. PATENT DOCUMENTS

| | | | | |
|---|---|---|---|---|
| 3,108,498 A | * | 10/1963 | Hedin et al. ....................... | 475/5 |
| 5,710,870 A | * | 1/1998 | Ohm et al. ..................... | 700/263 |
| 5,711,736 A | * | 1/1998 | Kyodo .......................... | 475/149 |

(Continued)

FOREIGN PATENT DOCUMENTS

| | | |
|---|---|---|
| DE | 102008033778 | 1/2010 |
| EP | 2321097 B1 | 5/2011 |

(Continued)

OTHER PUBLICATIONS

ST Robotics Information Page, Publication Date: May 9, 2008, Hyperlink: http://www.strobotics.com/r17.htm.*

(Continued)

*Primary Examiner* — Saul Rodriguez
*Assistant Examiner* — Brendan Tighe
(74) *Attorney, Agent, or Firm* — Mori & Ward, LLP

(57) ABSTRACT

A working robot according to an embodiment includes an arm part and a plurality of motors. The arm part includes a plurality of arm members. The plurality of motors respectively drives the plurality of arm members. Herein, rated powers respectively corresponding to the motors are the same.

11 Claims, 2 Drawing Sheets

(56) References Cited

U.S. PATENT DOCUMENTS

| | | | | |
|---|---|---|---|---|
| 5,784,542 | A * | 7/1998 | Ohm et al. | 700/260 |
| 6,612,449 | B1 * | 9/2003 | Otani et al. | 212/317 |
| 6,935,109 | B2 * | 8/2005 | Goldfarb et al. | 60/530 |
| 7,453,176 | B2 * | 11/2008 | Davison | 310/75 R |
| 7,836,584 | B2 * | 11/2010 | Lim | 29/787 |
| 8,105,008 | B2 * | 1/2012 | Givens | 414/744.3 |
| 8,465,005 | B2 * | 6/2013 | Givens | 254/93 R |
| 2005/0204850 | A1 * | 9/2005 | Nihei et al. | 74/490.01 |
| 2008/0092373 | A1 | 4/2008 | Lim | |
| 2008/0194345 | A1 * | 8/2008 | Choi | 464/180 |
| 2009/0013860 | A1 * | 1/2009 | Givens | 91/433 |
| 2009/0283490 | A1 * | 11/2009 | Givens | 212/317 |
| 2013/0057106 | A1 * | 3/2013 | Sajikawa et al. | 310/208 |
| 2013/0184112 | A1 * | 7/2013 | Choi et al. | 475/5 |

FOREIGN PATENT DOCUMENTS

| | | |
|---|---|---|
| JP | 10-077200 | 3/1998 |
| JP | 10-094982 | 4/1998 |
| JP | 11-198077 | 7/1999 |
| JP | 2001-341086 | 12/2001 |
| JP | 2008-230327 | 10/2008 |
| JP | 2009-132292 | 6/2009 |
| JP | 2009-202281 | 9/2009 |
| JP | 2010-058237 | 3/2010 |
| JP | 2010-120139 | 6/2010 |

OTHER PUBLICATIONS

ST Robotics Manual, Publication Date: Jan. 28, 2007, Hyperlink: http://www.strobotics.com/manuals/r17man.pdf.*

The Extended European Search Report for corresponding EP Application No. 12155965.2-1712, Apr. 16, 2013.

Japanese Office Action for corresponding JP Application No. 2011-195351, Jul. 16, 2013.

Partial European Search Report for corresponding EP Application No. 12155965.2-2314, Jan. 16, 2013.

Chinese Office Action for corresponding CN Application No. 201210037253.7, Aug. 1, 2014.

* cited by examiner

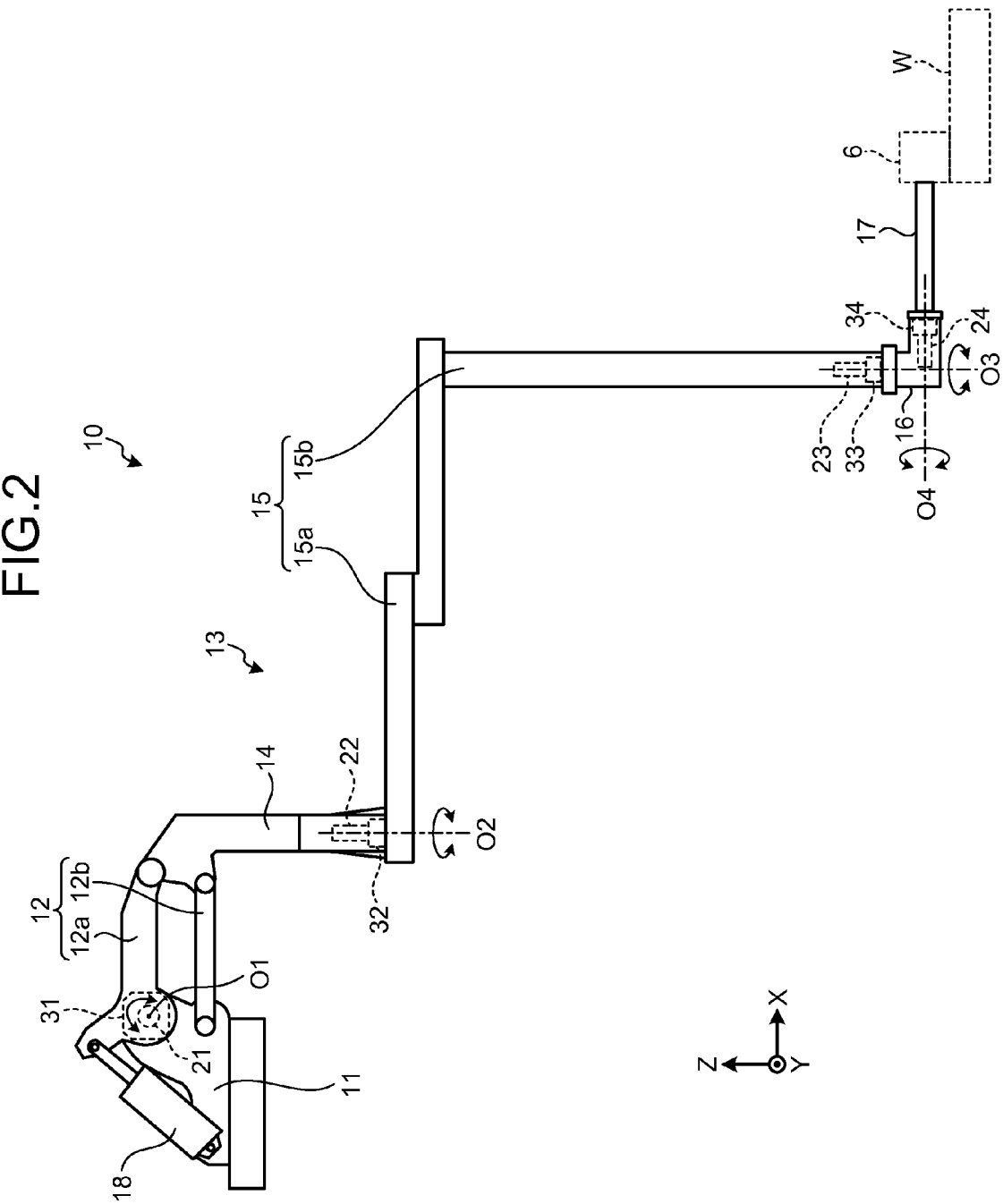

WORKING ROBOT AND PROCESSING PLANT

CROSS-REFERENCE TO RELATED APPLICATION

This application is based upon and claims the benefit of priority of the prior Japanese Patent Application No. 2011-195351, filed on Sep. 7, 2011, the entire contents of which are incorporated herein by reference.

FIELD

The embodiment discussed herein is directed to a working robot and a processing plant.

BACKGROUND

Conventionally, a working robot is widely used in a working field such as a production factory. It is general that a working field in which the working robot is placed is provided with a safe guard fence that is provided sufficiently away from a movable range of the working robot around the working robot to prevent contact between the working robot and an operator and to reduce an impact on the operator.

However, a working robot that performs a joint work together with a person without using a safe guard fence attracts attention recently. For example, Japanese Laid-open Patent Publication No. 2010-120139 discloses, for example, a working robot that provides an efficient working environment by assisting a work operation in which an operator is weak.

SUMMARY

A working robot according to an aspect of an embodiment includes an arm part that includes a plurality of arm members and a plurality of motors that respectively drives the plurality of arm members. Herein, rated powers respectively corresponding to the motors are the same.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 2 is a diagram illustrating the configuration of a working robot.

DESCRIPTION OF EMBODIMENT

Hereinafter, a working robot and a processing plant according to an embodiment of the present disclosure will be explained in detail with reference to the drawings. In addition, the embodiment disclosed below is not intended to limit the present invention.

Figure 1:
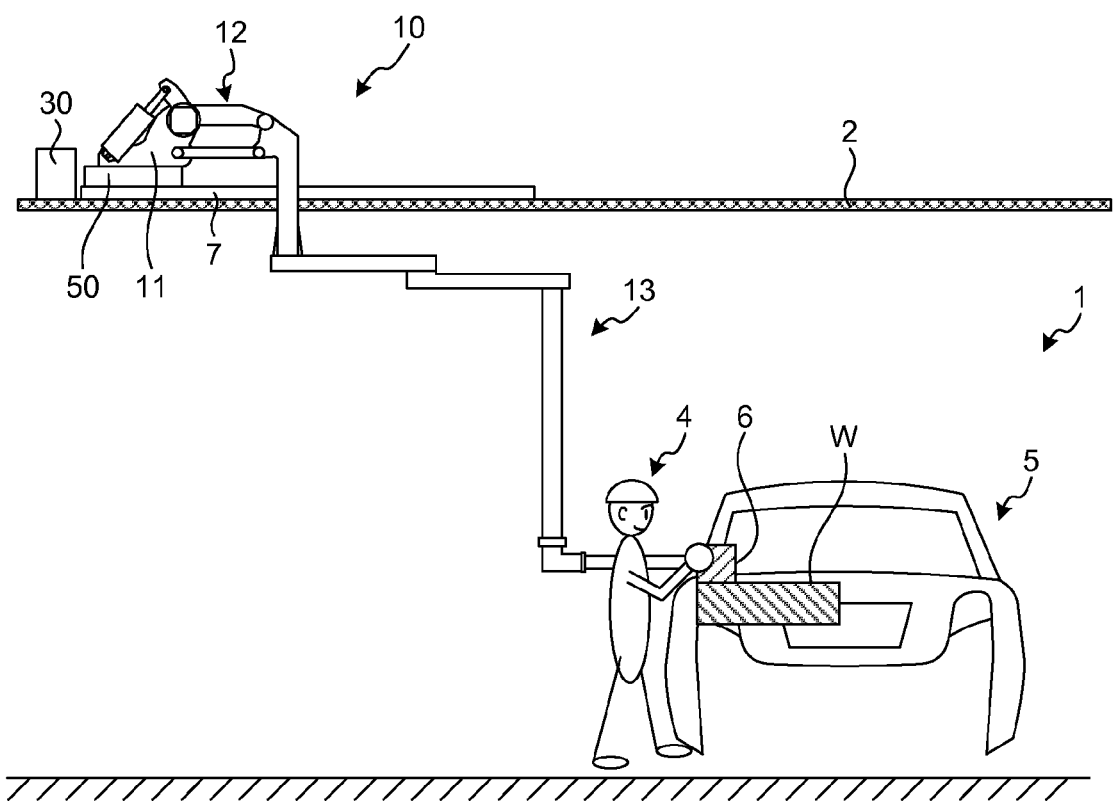
FIG. 1 is a diagram typically illustrating the schematic configuration of a processing plant according to an embodiment.
Figure 1:
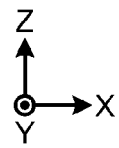

FIG. 1 is a diagram typically illustrating the schematic configuration of a processing plant according to the present embodiment. Hereinafter, a robot that assists the assembly of a vehicle (example of process target) such as an automobile is explained as an example of a working robot included in a processing plant. However, the present embodiment is not limited to this. The working robot can be applied to various work operations. Moreover, it is assumed that the positive direction of X-axis is a front direction, the positive direction of Y-axis is a right direction, and the positive direction of Z-axis is an upper direction.

As illustrated in FIG. 1, the processing plant according to the present embodiment includes a working space 1 in which an operator 4 performs a processing operation on a vehicle 5 that is an example of a process target, a ceiling 2 that is a supporting member provided at the upper side of the working space 1, and a working robot 10.

A holding mechanism 6 that holds a workpiece W that is a transport target transported by the working robot 10 is attached to the leading end of the working robot 10. The operator 4 can easily assemble the workpiece W held in the holding mechanism 6 into the vehicle 5 by moving the position of the holding mechanism 6. Moreover, the workpiece W that is a transport target is, for example, a seat assembly for the vehicle 5 or a spare tire mounted on the vehicle 5. Moreover, the holding mechanism 6 may employ, for example, a well-known mechanism that can hold or uphold a transport target.

The working robot 10 includes a base part 11, a lifting link mechanism 12, and an arm part 13. The working robot 10 lifts and lowers the arm part 13 by driving first to fourth motors to be described below, and further moves the holding mechanism 6 to desired position and posture by changing the posture of the arm part 13.

A travelling rail 7 is laid down along the ceiling 2 at the backside of the ceiling 2 above the working space 1. The working robot 10 can move along the ceiling 2 in an anteroposterior direction by using a travel device 50 that is provided on the bottom of the base part 11. Because the lifting link mechanism 12 and the arm part 13 are supported by the base part 11, the position of the holding mechanism 6 attached to the leading end of the arm part 13 can be moved in an anteroposterior direction by moving the base part 11 over the travelling rail 7.

The working robot 10 is controlled by a control device 30. The control device 30 previously stores therein control commands that are applied to the working robot 10. The working robot 10 is controlled on the basis of the memory contents.

For example, when the assembly operation of the vehicle 5 by the operator 4 is not performed, the control device 30 controls the working robot 10 to be an initial position. More specifically, the control device 30 drives the travel device 50 to move the working robot 10 to the backmost side and also drives the lifting link mechanism 12 to upward lift the arm part 13. Furthermore, the control device 30 drives the arm part 13 to make the arm part 13 have a previously defined posture and thus sets the working robot 10 at an initial position.

When the assembly operation of the vehicle 5 by the operator 4 is performed, the control device 30 drives the travel device 50 to move the working robot 10 in a front direction and also drives the lifting link mechanism 12 to downward move the arm part 13. Furthermore, the control device 30 drives the arm part 13 to make the arm part 13 have a desired posture and thus positions the holding mechanism 6 at the place at which the operator 4 assembles the vehicle 5. In this way, because the holding mechanism 6 can be positioned at the working position of the operator 4, the operator 4 can easily assemble the workpiece W into the vehicle 5 while adjusting the position and posture of the workpiece W held in the holding mechanism 6.

Next, the specific configuration of the lifting link mechanism 12 and the arm part 13 will be explained. FIG. 2 is a diagram illustrating the configuration of the working robot 10. As described above, the working robot 10 includes the base part 11, the lifting link mechanism 12, and the arm part 13. Moreover, the holding mechanism 6 is attached to the leading end of the arm part 13. The arm part 13 includes a first arm member 14, a second arm member 15, a third arm member 16, and a fourth arm member 17. The position and posture of the holding mechanism 6 can be changed by changing the posture of the arm part 13.

The base part 11 includes a first motor 21 and a first speed reducer 31 that decelerate the output of the first motor 21. The rotation of the first motor 21 is introduced into the lifting link mechanism 12 via the first speed reducer 31 by driving the first motor 21, and thus lifting or lowering is performed by the lifting link mechanism 12. The lifting link mechanism 12 connects the base part 11 to the bottom end of the arm part 13 to lift or lower the arm part 13. The lifting link mechanism 12 is a link mechanism that is connected to the bottom end of the first arm member 14 to lift or lower the first arm member 14 as its posture is maintained.

More specifically, the lifting link mechanism 12 includes a first link member 12a and a second link member 12b. The bottom end of the first link member 12a is rotatably supported by the base part 11 around a horizontal axis O1. Moreover, the leading end of the first link member 12a rotatably supports the upper portion of the bottom end of the first arm member 14.

On the other hand, the bottom end of the second link member 12b is rotatably supported by the base part 11 around a horizontal axis parallel to the axis O1. Moreover, the leading end of the second link member 12b rotatably supports the lower portion of the bottom end of the first arm member 14.

The bottom end of the first arm member 14 is lifted or lowered by rotating the first link member 12a around the axis O1 by using the first motor 21. At this time, the posture of the first arm member 14 is constantly maintained by the second link member 12b.

In order to easily lift or lower the arm part 13 by using the lifting link mechanism 12, an air balancer 18 is attached to the working robot 10. The air balancer 18 is placed between the base part 11 and the lifting link mechanism 12, and adds a tensile force, which corresponds to a weight obtained by adding one-half of the load capacity of the arm part 13 to its own weight, to the lifting link mechanism 12.

Because the air balancer 18 is provided in this way, the load of the first motor 21 can be suppressed in half in comparison with the case where the air balancer 18 is not provided. For example, assuming that the weight of the arm part 13 is 100 kg and the load capacity is 60 kg, the maximum load of the first motor 21 may be 30 kg. Moreover, a counter weight or another balancer may be used in place of the air balancer 18.

In the first arm member 14, its bottom end is connected to the leading end of the lifting link mechanism 12 and its leading end extends downward. The bottom end of the second arm member 15 is rotatably supported on the leading end of the first arm member 14 around an axis O2 parallel to a gravitational force direction. The leading end of the first arm member 14 includes therein a second motor 22 and a second speed reducer 32 that decelerate the output of the second motor 22. The rotation of the second motor 22 is introduced into the bottom end of the second arm member 15 via the second speed reducer 32 by driving the second motor 22. As a result, the bottom end of the second arm member 15 rotates around the axis O2.

The second arm member 15 includes a horizontal arm member 15a that extends from the bottom end to its front direction and a vertical arm member 15b that is connected to the leading end of the horizontal arm member 15a and extends downward. The bottom end of the third arm member 16 is rotatably connected to and supported on the leading end of the vertical arm member 15b, that is to say, the leading end of the second arm member 15 around an axis O3 parallel to the gravitational force direction.

The leading end of the vertical arm member 15b includes therein a third motor 23 and a third speed reducer 33 that decelerate the output of the third motor 23. The rotation of the third motor 23 is introduced into the bottom end of the third arm member 16 via the third speed reducer 33 by driving the third motor 23. As a result, the bottom end of the third arm member 16 rotates around the axis O3.

The bottom end of the fourth arm member 17 is rotatably connected to and supported on the leading end of the third arm member 16 around a horizontal axis O4. The leading end of the third arm member 16 includes therein a fourth motor 24 and a fourth speed reducer 34 that decelerate the output of the fourth motor 24. The rotation of the fourth motor 24 is introduced into the bottom end of the fourth arm member 17 via the fourth speed reducer 34 by driving the fourth motor 24. As a result, the bottom end of the fourth arm member 17 rotates around the axis O4. The holding mechanism 6 is attached to the fourth arm member 17 to rotate around the axis O4 in accordance with the rotation of the fourth arm member 17.

In this case, the motors 21 to 24 and the speed reducers 31 to 34 are not limited to the arrangement illustrated in FIG. 2. Therefore, the arrangement can be appropriately changed. For example, the second motor 22 and the second speed reducer 32 may be housed in the second arm member 15, or the third motor 23 and the third speed reducer 33 may be housed in the third arm member 16.

In the working robot 10 of the present embodiment, the motors 21 to 24 have low rated powers. More specifically, the rated powers of the motors 21 to 24 are set to powers that have a little impact on the operator 4 and the rated powers of the motors 21 to 24 are the same.

By setting the rated powers of the motors 21 to 24 to the same value in this way, a drive performance of the working robot 10 can be effectively improved within a range in which a safety impact on the operator 4 is sufficiently small. Therefore, the person-coexisting type working robot that performs a joint work together with the operator 4 can be easily provided.

For example, when the operator 4 comes in contact with the working robot 10, an impact on the operator 4 can be reduced by setting all the rated powers of the motors 21 to 24 to 80 W. Moreover, the rated powers of the motors 21 to 24 may not have the same value in a strict meaning. For example, it may be said that rated powers are the same if the power values are within ±5% to ±10%.

The control device 30 (see FIG. 1) sets the number of motors that are simultaneously driven to one among the plurality of motors 21 to 24. As a result, the maximum power at a position (hereinafter, tool center point) of the holding mechanism 6 attached to the arm part 13 can be suppressed low. For example, assuming that all the rated powers of the motors 21 to 24 are 80 W, the maximum power at the tool center point becomes 80 W and thus an impact on the operator 4 can be reduced.

Herein, it has been explained that the rated powers of the motors 21 to 24 are 80 W as an example. However, the rated powers are not limited to 80 W. For example, when the range of a rated power in which a robot has an impact on the operator 4 is defined by a technical standard of the robot, the rated powers of the motors 21 to 24 may be set to values lower than the rated powers of the range defined by the technical standard.

Meanwhile, a rated power (W) is a value that is determined by a rated speed (rpm) and a rated torque (N·m). Therefore, the motors 21 to 24 change rated speeds and rated torques, while maintaining the rated powers as the same value, to have appropriate specifications according to the axes O1 to O4, and thus the performance of the working robot 10 can be improved.

For example, the first motor 21 is a motor that drives the lifting link mechanism 12. It is desirable that the elevating speed of the lifting link mechanism 12 is fast. On the other hand, because a torque required for a lifting operation by the lifting link mechanism 12 is suppressed by the air balancer 18, the rated torque of the first motor 21 can be suppressed low. Therefore, the first motor 21 employs a speed-based motor of which the rated speed is relatively large and the rated torque is relatively small.

The second motor 22 is a motor that drives the second arm member 15. Because the second arm member 15 driven by the second motor 22 is longer in a horizontal direction, a travel distance of the leading end of the second arm member 15 is larger compared to a driving amount of the second motor 22 around the axis O2. Therefore, the second motor 22 employs a torque-based motor of which the rated speed is relatively small and the rated torque is relatively large. The second motor 22 has the largest rated torque among all the motors 21 to 24.

Moreover, the third motor 23 and the fourth motor 24 respectively drive the third arm member 16 and the fourth arm member 17. Herein, the motors do not lean to any one of a rotational speed and a torque. Therefore, the third motor 23 and the fourth motor 24 have rated speeds and rated torques that are relatively middle values. In other words, the rated speeds of the third motor 23 and the fourth motor 24 are between the rated speed of the first motor 21 and the rated speed of the second motor 22. Moreover, the rated torques of the third motor 23 and the fourth motor 24 are smaller than that of the second motor 22. Generally, a motor and a speed reducer have a small size (model number) when an input torque and an output torque are small. For this reason, the third and fourth motors 23 and 24 and the third and fourth speed reducers 33 and 34 may be smaller and more lightweight than the second motor 22 and the second speed reducer 32. As a result, the leading-end-side load of the second motor 22 can be suppressed, and thus the working robot 10 can be actuated in a practical time even if an output is small. Furthermore, when the workpiece W is transferred into a car body, for example, an interference (contact) area between the vehicle 5 and the working robot 10 is reduced by suppressing the sizes of the third motor 23 and the fourth motor 24 and thus degrees of freedom of work operations are improved.

In this way, the working robot 10 according to the present embodiment includes the first to fourth arm members 14 to 17 and the plurality of motors 21 to 24 that respectively drive the first to fourth arm members 14 to 17 and have the same rated power.

Because the rated powers of the motors 21 to 24 are the same, the drive performance of the working robot 10 can be effectively improved within a range in which an impact on the operator 4 is small. Moreover, the drive performance of the working robot 10 can be effectively improved by setting the rated speeds and the rated torques of the motors 21 to 24 to appropriate values with respect to the axes O1 to O4.

The working robot 10 described above decelerates the outputs of the motors 21 to 24 by using the speed reducers 31 to 34 and supplies the outputs to the first to fourth arm members 14 to 17. In this way, the adjustment of the number of rotations and a torque for the axes O1 to O4 can be easily performed by using the speed reducers 31 to 34. Moreover, the outputs of the motors 21 to 24 may be directly supplied to the first to fourth arm members 14 to 17.

When designing the working robot 10, the motors 21 to 24 have rated speeds and rated torques that are appropriately set in accordance with the axes O1 to O4. However, a motor according to a rated speed and a rated torque that are set may not exist in many cases. In this case, a motor according to a rated speed and a rated torque that are set is individually designed and manufactured.

Because a rated speed and a rated torque are decided by the characteristic of a rotor and the characteristic of a stator, individually designing and manufacturing a rotor and a stator cause the increase of a design cost and a manufacturing cost.

Therefore, the increase of a design cost and a manufacturing cost may be suppressed by changing a part of an existing motor to obtain a desired rated power. More specifically, a motor of which the rated torque is identical with a desired rated torque and the rated speed is larger than a desired rated speed is selected among existing motors that include a stator in which a stator coil is attached to a stator core and a rotor that is placed opposite the inner circumferential side of the stator.

Then, the rated speed is adjusted to be identical with the desired rated speed by changing the stator coil of the selected motor. The change of the stator coil is performed by increasing the resistance of the stator coil, for example, by reducing the wire size of a conducting wire that forms the stator coil or by increasing the number of coils of the stator coil. An electric current flowing into the stator coil is decreased by increasing the resistance of the stator coil, and thus a rated speed can be decreased.

In this way, because a motor that has a desired rated power can be provided by changing the stator coil of the existing motor, a cost of the motor can be reduced in comparison with the case where the motor is newly designed and manufactured.

The working robot 10 described above may include a sensor that detects whether the operator 4 enters a range in which the operator may come in contact with the arm part 13. Then, when the sensor detects that the operator 4 enters a detection range, the control device 30 stops driving the lifting link mechanism 12, the arm part 13, and the travel device 50. As a result, the impact on the operator 4 can be further prevented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A working robot comprising:
   an arm part that includes a plurality of arm members;
   a plurality of first motors that respectively drive the plurality of arm members;
   a base part;
   a lifting link mechanism that connects the base part to a bottom end of the arm part, the lifting link mechanism lifting or lowering the arm part;
   as second motor that actuates the lifting link mechanism; and
   a balancer that assists the lifting link mechanism to easily lift or lower the arm part, the balancer being placed between the base part and the lifting link mechanism, wherein the first and second motors have a same rated power as determined by a rated speed and a rated torque of each respective motor,
wherein the first and second motors include a speed-based motor of which the rated speed is relatively large and the rated torque is relatively small and a torque-based motor of which the rated speed is relatively small and the rated torque is relatively large, and
wherein the plurality of arm members includes:
a first arm member that is connected to the lifting link mechanism and extends downward; and
a second arm member that is rotatably connected to a leading end of the first arm member and extends in a horizontal direction, and
a motor of the first and second motors that rotates the second arm member has a largest rated torque, and
the speed-based motor drives the lifting link mechanism, and
the torque-based motor drives the arm part.

2. The working robot according to claim 1, wherein the arm part further includes:
the third arm member that is rotatably connected to the second arm member and extends downward;
the fourth arm member that is rotatably connected to a leading end of the third arm member and extends in a horizontal direction;
the motor that rotates the third arm member around an axis parallel to a gravitational force direction; and
the motor that rotates the fourth arm member around a horizontal axis.

3. The working robot according to claim 2, wherein the fourth arm member is provided with a holding mechanism that holds a transport target.

4. The working robot according. to claim 1, wherein output shafts of the plurality of motors are provided with speed reducers that respectively decelerate outputs of the motors and supply the outputs to the plurality of arm members.

5. The working robot according to claim 1, wherein
the first motors drive the plurality of arm members in the horizontal direction, and
the second motors drive the lifting link, mechanism in a lifting or lowering direction.

6. A processing plant comprising:
a working space on which an operator and a process target exist;
a supporting member that is provided above the working space;
a travel device that is provided on the supporting member to travel along the supporting member;
a base part that is attached to the travel device;
a lifting link mechanism that is connected to the base part;
an arm part that includes a plurality of arm members and that is connected to the lifting link mechanism to move up and down;
a plurality of first motors that respectively drive the plurality of arm members;
a second motor that actuates the lifting link mechanism; and
a balancer that assists the lifting link mechanism to easily lift or lower the arm part, the balancer being placed between the base part and the lifting link mechanism,
wherein the first and second motors have a same rated power as determined by a rated speed and a rated torque of each respective motor,
wherein the second motor is a speed-based motor of which a rated speed is relatively large and a rated torque is relatively small,
wherein a motor of the first and second motors is a torque-based motor of which a rated speed is relatively small and a rated torque is relatively large as compared to the speed-based motor, and
wherein the plurality of arm members includes:
a first arm member that is connected to the lifting link mechanism and extends downward; and
a second arm member that is rotatably connected to a leading end of the first arm member and extends in a horizontal direction, and
a motor of the first and second motors that rotates the second arm member has a largest rated torque.

7. The processing plant according to claim 6, wherein the arm part further includes:
a third arm member that is rotatably connected to the second arm member and extends downward;
a fourth arm member that is rotatably connected to a leading end of the third arm member and extends in a horizontal direction;
the motor that rotates the third arm member around an axis parallel to a gravitational force direction; and
the motor that rotates the fourth arm member around a horizontal axis.

8. The processing plant according to claim 7, wherein the fourth arm member is provided with a holding mechanism that holds a transport target.

9. The processing plant according to claim 6, wherein output shafts of the plurality of motors are provided with speed reducers that respectively decelerate outputs of the motors and supply the outputs to the plurality of arm members.

10. A working robot comprising:
an arm part that includes a plurality of arm members;
a plurality of first driving means that respectively drives the plurality of arm members;
a base part;
a lifting link mechanism that connect the base part to a bottom end of the arm part, the lifting link mechanism lifting or lowering the arm part;
a second driving means that actuates the lifting link mechanism; and
a balancer that assists the lifting link mechanism to easily lift or lower the arm part, the balancer being placed between the base part and the lifting link mechanism,
wherein the first and second driving means have a same rated power as determined by a rated speed and a rated torque of each respective driving means,
wherein the first and second driving means include a speed-based motor of which a rated speed is relatively large and a rated torque is relatively small and a torque-based motor of which a rated speed is relatively small and a rated torque is relatively large, and
wherein the plurality of arm members includes:
a first arm member that is connected to the lifting link, mechanism and extends downward; and
a driving means of the first driving means that rotates the second arm member has a largest rated torque, and
the speed-based motor drives the lifting link mechanism, and
the torque-based motor drives the arm part.

11. The working robot according to claim 10, wherein
the first motors drive the plurality of arm members in the horizontal direction, and
the second motor drives the lifting link mechanism in a lifting or lowering direction.

* * * * *